United States Patent [19]

Nakayashiki et al.

[11] Patent Number: 4,495,595
[45] Date of Patent: Jan. 22, 1985

[54] METHOD AND SYSTEM OF LOOP TRANSMISSION

[75] Inventors: Susumu Nakayashiki, Yokohama; Isao Nakada; Masahiko Kida, both of Hadano; Toyokazu Hashimoto, Kanagawa; Kazuo Yagyu, Atsugi, all of Japan

[73] Assignee: Hitachi, Ltd., Tokyo, Japan

[21] Appl. No.: 364,539

[22] Filed: Apr. 1, 1982

[30] Foreign Application Priority Data

Apr. 3, 1981 [JP] Japan .................................. 56-49318
Jan. 29, 1982 [JP] Japan .................................. 57-11640

[51] Int. Cl.³ .............................................. G06F 1/00
[52] U.S. Cl. .................................. 364/900; 340/825.05
[58] Field of Search ... 364/200 MS File, 900 MS File; 370/85, 86, 88; 340/825.05

[56] References Cited

U.S. PATENT DOCUMENTS

| | | | |
|---|---|---|---|
| 3,919,483 | 11/1975 | Gindi et al. | 364/200 |
| 3,970,994 | 7/1976 | Jenny | 364/200 |
| 4,136,384 | 1/1979 | Okada et al. | 364/200 |
| 4,227,198 | 10/1980 | Gergaud et al. | 364/900 |
| 4,354,226 | 10/1982 | Flickinger et al. | 364/200 |
| 4,363,093 | 12/1982 | Davis et al. | 364/200 |
| 4,374,436 | 2/1983 | Armstrong | 364/900 |

Primary Examiner—Raulfe B. Zache
Attorney, Agent, or Firm—Antonelli, Terry & Wands

[57] ABSTRACT

In a loop transmission system utilizing specific patterns, a specified station for sending the specific patterns sends a specific pattern S or a specific frame S' which is not delayed in each station in advance of sending a specific pattern G used for data exchanging in each station, thereby ensuring rapid detection of abnormality of the specific pattern G.

12 Claims, 22 Drawing Figures

METHOD AND SYSTEM OF LOOP TRANSMISSION

BACKGROUND OF THE INVENTION

The present invention relates to a method and system of loop transmission utilizing specific patterns.

Generally, in this type of loop transmission system, only one specific pattern circulates through a loop, and a fault in the specific pattern is so serious that operation of the entire loop system is affected by the faulty specific pattern.

In a prior art loop transmission system utilizing the specific pattern, the master station sends only a specific pattern which is utilized for exchanging in each slave station, and abnormality of the specific pattern is monitored by simply monitoring the time for the specific pattern to circulate through one loop. This monitoring fails to detect faulty disappearance of the specific pattern because in such an event, time-up of the monitoring timer results. In addition, if a plurality of specific patterns are generated by fault of the specific pattern sending device of the master station and they are circulated through the loop, these faulty specific patterns cannot be detected. In particular, when a GO AHEAD pattern (hereinafter simply referred to as GA) is used as the specific pattern, disappearance of the GA can be detected by monitoring the maximum delay time for frame loop circulation $T_\beta$ of the GA since the maximum time $T_\beta$ is a known value that can be calculated from the data transmission rate, the bit delay time in each station and the system construction. Namely, the monitoring station restarts the maximum time $T_\beta$ each time the GA is detected and judges that disappearance of the GA occurs when the maximum time $T_\beta$ is up. But occurrence of doubling and disappearance of the GA within the maximum time $T_\beta$ cannot be detected.

The number of frequencies of occurrence of a doubled GA during circulation of the normal GA through one loop is unknown. Also, it is impossible to discriminate whether the GA detected by the monitoring station is the normal GA or the doubled GA. In the event of occurrence of the doubled GA, the interval between one GA detection and the other GA detection by the monitoring station is decreased and the monitoring station simply judges that the decreased interval is due to the absence of data sent from the slave station, thus failing to detect the doubled GA. Briefly, the prior art specific pattern monitoring system is disadvantageous in that it can detect disappearance of the specific pattern but cannot detect doubling thereof. Today, the number of stations being coupled to the loop is increasing and the detection of a doubled GA is of great significance.

On the other hand, each station erases, at the unit of 8 bits, the frame sent by its own station which has been exchanged at a communicating station and thereafter returned to the originating station. Each station also performs an operation for inserting "0" and erasing "0" in order to maintain the transparence of data as will be described later. Under these circumstances, if "0" is inserted in the sending frame, the sending frame length will be elongated by bits corresponding to the number of "0" data inserted. As a result, the sending frame is divided by 8, leaving behind a surplus which turns into an unerased part of a frame that causes various kinds of abnormality in the system.

The originating station monitors the originating station address in the received frame to judge whether or not the received frame is the frame it has sent, and erases the received frame which is identical with the frame it has sent. If the originating station address undergoes bit errors and turns into a non-existent station address, the bit error address will turn into a destination lost frame which cannot be erased by any existing station and which permanently circulates through the loop. The destination lost frame would cause another bit error which would be received by an uncertain station, thus raising an abnormality in the system.

SUMMARY OF THE INVENTION

An object of this invention is to provide a method and system of loop transmission capable of readily detecting the disapperance and the doubling of a specific pattern.

Another object of the invention is to provide a method and system of loop transmission capable of eliminating a faulty frame, such as unerased part of frame, and a destination lost frame.

To accomplish the above objects, according to a first feature of this invention, before a specified station sends to a loop a first specific pattern for successively allotting each station with a right to transmission, a second specific pattern is sent to the loop, the second specific pattern being sent to the loop before an exchanging frame is sent from each station other than the specified station, and the two specific patterns are monitored for detection of disappearance and doubling of the specific patterns.

According to a second feature of this invention in addition to the first feature, a specified pattern which does not affect data transmission is kept to be sent to the loop during an interval between completion of the sending of the first specific pattern and the return of the second specific pattern to the specified station following circulation of the second specific pattern through one loop.

DESCRIPTION OF THE PREFERRED EMBODIMENTS

Figure 1:
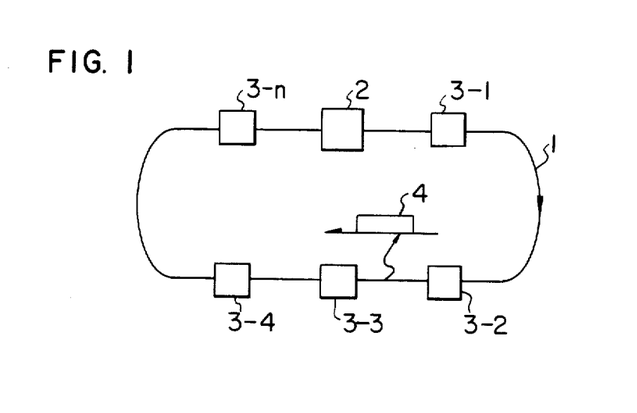
FIG. 1 is a schematic diagram of a loop transmission system according to the invention.

Referring now to FIG. 1, a loop transmission system according to the invention is shown schematically which comprises a loop 1, a master station 2, and slave stations 3-1 to 3-n. Denoted by reference numeral 4 is transmission information circulated through the loop 1.

Figure 2:
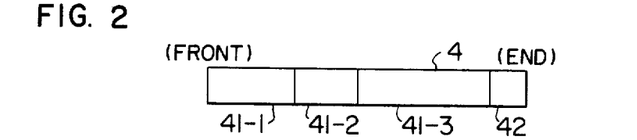
FIG. 2 is a diagrammatic representation of a prior art data format circulated through the loop.

Generally, in a loop transmission system utilizing a specific pattern, information having a format as shown in FIG. 2 is circulated through the loop 1. When detecting the specific pattern, each station erases the specific pattern and sends data of its own. Then, each station sends data or exchanging frames 41-1, 41-2 and 41-3, respectively, and thereafter a specific pattern 42. Accordingly, the time for the specific pattern 42 to circulate through one loop increases in proportion to the amount of sending data in each station. Only one specific pattern 42 exists on the loop 1.

Figure 3:
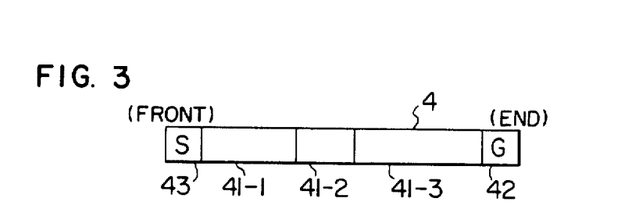
FIG. 3 is a diagrammatic representation of a circulating data format according to the invention.

The present invention, however, features the provision of two types of specific pattern as shown in FIG. 3 in a loop transmission system, one being a pattern 42 such as a GA pattern (hereinafter referred to as pattern G) which is detectable by all the stations and the other being a pattern 43 (hereinafter referred to as pattern S) which is detectable by only the master station.

Accordingly, in the loop transmission system of the invention, transmission data circulated through the loop 1 has a format as shown in FIG. 3. In the master station 2, the pattern S is sent to the loop before sending the pattern G. The pattern G is used for sending the exchanging frame in each station and the time for the pattern G to circulate through one loop increases in proportion to the amount of exchanging frame data in each station whereas the time for the pattern S to circulate through one loop is fixed.

Figure 4A:
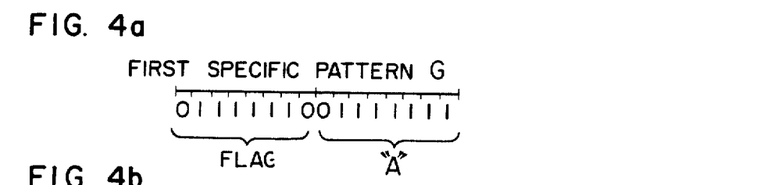
FIGS. 4a and 4b show examples of the format of the specific patterns according to the invention.
Figure 4B:
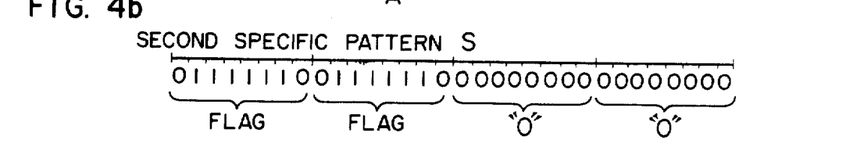

The patterns G and S have formats as exemplified in FIGS. 4a and 4b, respectively. In ordinary transmission, in order to make a distinction between data and a flag pattern (a pattern of 6 continuous "1" bits) representative of the start or end of data, it is not permitted to provide 6 continuous "1" bits in the data. Accordingly, the pattern G consists of a flag pattern, and "0" and 7 continuous "1" bits, and the pattern S consists of a first flag pattern, a second flag pattern, and 16 continuous "0" bits. Only one specific pattern G and only one specific pattern S as mentioned above exist on the loop.

Since, in the high-level data link control procedure, 6 continuous "1" bits are not permitted to appear in the exchanging data, the patterns S and G constitute specific patterns which never appear in the exchanging data. In other words, on the transmitter side, "0" is forcibly inserted when 5 continuous "1" bits appear in the exchanging data whereas on the receiver side, "0" which follows 5 continuous "1" bits is deleted. On the receiver side, 6 continuous "1" bits are recognized as a flag pattern indicative of the end of a exchanging data or the partition of frame.

Through the above treatment, the appearance of the specific pattern is normally prevented.

The exchanging frame has a format as indicated below.

| F Address C Exchanging data F | |
| --- | --- |
| F (flag pattern) | 01111110 |
| C (control) | used for sequence check in data exchanging |
| Address | addresses of originator and destination |

The present invention is further featured by inserting a time fill-up code in the interval between the GA or the specific pattern G which is sent subsequent to the exchanging data frame and the specific pattern S which is sent in advance of the exchanging data frame.

Briefly, the present invention features the provision of the specific pattern S preceding the data area and the specific pattern G succeeding the data area for making a distinction between the data area and the data absent area, and the inserting of the time fillup code E in the recognized data absent area.

Figure 5:
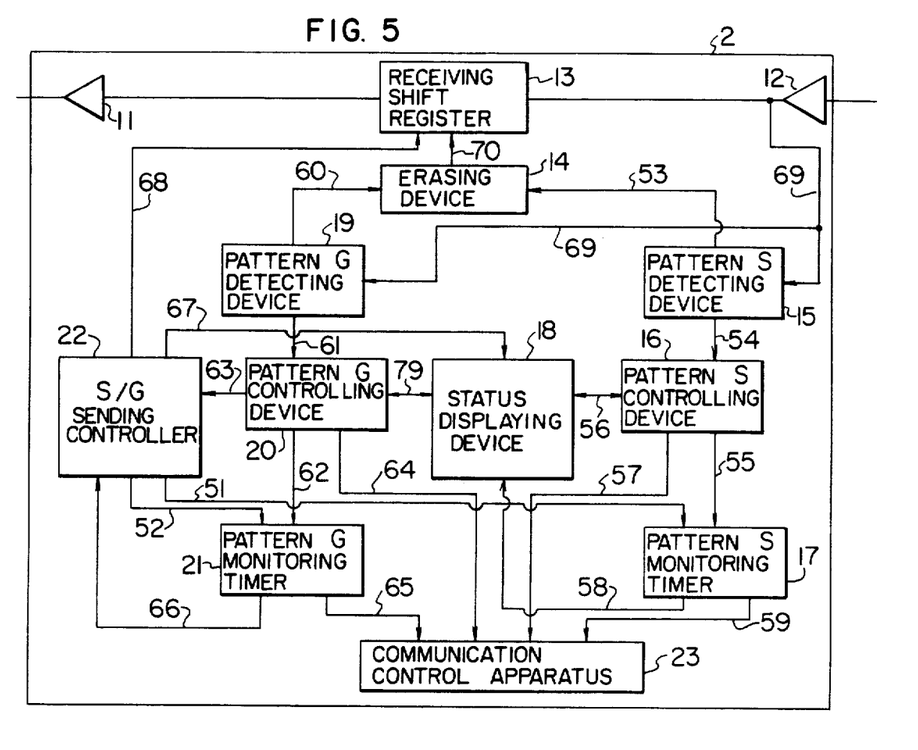
FIG. 5 is a block diagram showing one embodiment of the master station incorporating the invention.

FIG. 5 shows one embodiment of a master station incorporating the present invention.

As shown in block form, the master station comprises a modulator 11, a demodulator 12, a receiving shift register 13, an erasing device 14, a pattern S detecting device 15, a pattern S controlling device 16, a patterns S monitoring timer 17, a device 18 for displaying the monitored state of the pattern S, a pattern G detecting device 19, a pattern G controlling device 20, a pattern G monitoring timer 21, a device 22 for controlling sending of patterns S/G, and a communication control apparatus 23.

The S/G pattern sending control device 22 starts (sets) the pattern S monitoring timer 17 and the pattern G monitoring timer 21 via signal lines 51 and 52 at the time when patterns S and G are sent. The monitoring timers 17 and 21 serve to monitor times for the patterns S and G to circulate through one loop. The pattern S monitoring timer 17 is set to a value which neglects a delay in each slave station and hence equals one loop circulation time for the pattern S. The pattern G monitoring timer 21 on the other hand is set to a value which is equal to a time for the pattern G to circulate through one loop when a possible maximum number of frames are sent from each slave station. When sending the patterns S and G, the controlling device 22 sets the device 18 for displaying the monitored state of the pattern S to "1" indicative of a monitoring operation.

After a fixed time, the pattern S has circulated through the one loop and it returns to the master station. The pattern S detecting device 15 then detects the pattern S and through a signal line 53, it instructs the erasing device 14 to erase the received pattern S in the receiving shift register 13 and at the same time, informs the pattern S controlling device 16 of the detection of the pattern S via a signal line 54.

When the device 18 for displaying the monitored state of pattern S is issuing "1" indicative of a monitoring operation, the pattern S controlling device 16 resets the pattern S monitoring timer 17 via a signal line 55 and at the same time, sets the device 18 for displaying the monitored state of the pattern S to "0" indicative of a non-monitoring operation via a signal line 56. If the device 18 has already been issuing "0" indicative of a non-monitoring operation when the pattern S is detected, this condition is recognized as an abnormal doubled pattern S and the pattern S controlling device 16 informs the communication control apparatus 23 of the abnormal condition via a signal line 57.

If the pattern S is not detected before the time of the pattern S monitoring timer 17 is up, this condition is recognized as an abnormal disappearance of the pattern S. When the time of the timer 17 is up, the pattern S monitoring timer 17 sets the device 18 to "0" indicative of a non-monitoring operation via a signal line 58 and at the same time, it informs the communication control apparatus 23 of the disappearance of the pattern S.

The pattern G follows the exchanging frame of each slave station and returns to the master station. When detecting the pattern G, the pattern G detecting device 19 instructs, through a signal line 60, the erasing device 14 to erase the received pattern G in the receiving shift register 13 and at the same time, it informs the pattern G controlling device 20 of the detection of the pattern G via a signal line 61.

If the device 18 for displaying the monitored state of the pattern S issues "0" indicative of a non-monitoring operation, the pattern G controlling device 20 resets the pattern G monitoring timer 21 via a signal line 62 and at the same time, it communicates with the device 22 via a signal line 63, for controlling the sending of pattern S/G. The device 22 sends the patterns S and G and at the same time, it restarts (sets again) the pattern S monitoring timer 17 and pattern G monitoring timer 21 and sets the device 18 to "1" indicative of a monitoring operation. If the device 18 is issuing "1" indicative of a monitoring operation when the pattern G is detected, this condition is recognized as an abnormal doubled pattern G and the pattern G controlling device 20 informs the communication control apparatus 23 of the abnormal condition via a signal line 64.

If the pattern G is not detected before the time of the pattern G monitoring timer 21 is up, this condition is recognized as an abnormal disappearance of the pattern G. When the time of the timer 21 is up, the pattern G monitoring timer 21 informs the communication control apparatus 23 and device 22 of the pattern G disappearance via signal lines 65 and 66, respectively. The device 22 sends the patterns S and G and at the same time, it restarts (sets again) the pattern S monitoring timer 17 and pattern G monitoring timer 21 and sets the device 18 to "1" indicative of a monitoring operation via a signal line 67.

The patterns S and G from the device 22 are sent to the receiving shift register 13 via a signal line 68 and thereafter to the loop via the modulator 11.

Data from the loop, on the other hand, is applied to the pattern S detecting device 15 and pattern G detecting device 19 via the demodulator 12 and a signal line 69.

Figure 6:
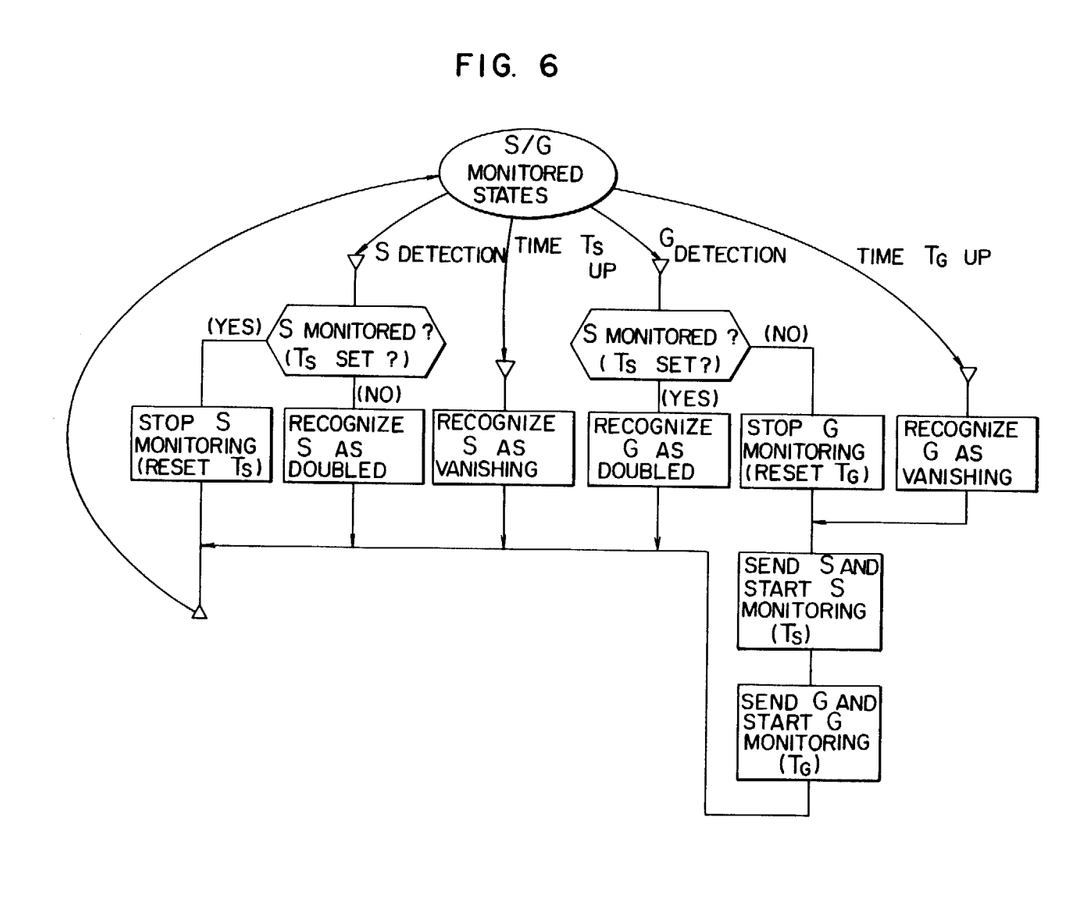
FIG. 6 is a diagram outlining the operation of the FIG. 5 embodiment.

FIG. 6 outlines the operation of the FIG. 5 master station. According to FIG. 6, setting of the pattern S monitoring timer 17 is examined to check the S monitored state display.

In FIG. 6, $T_S$ represents the monitoring time for the pattern S, $T_G$ the monitoring time for the pattern G, and S and G the patterns S and G.

Figure 7:
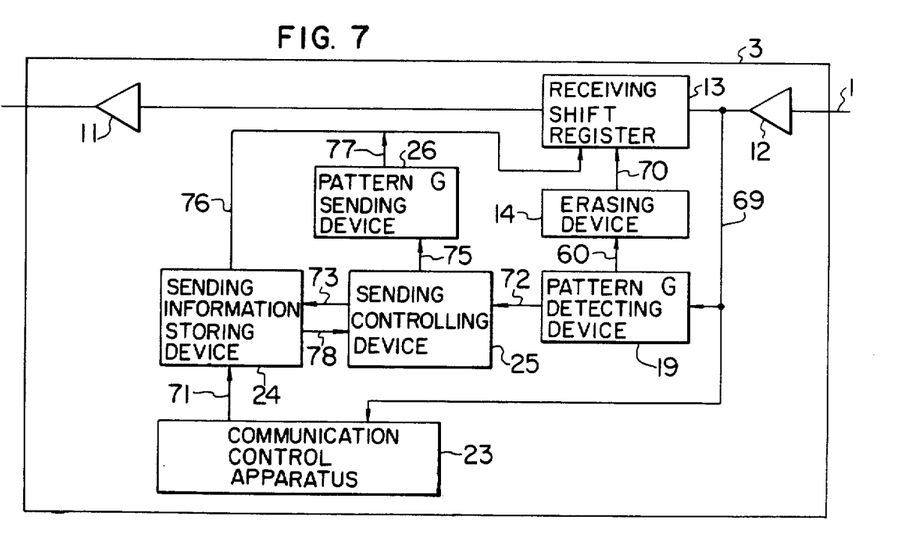
FIG. 7 is a block diagram showing one embodiment of the slave station incorporating the invention.

FIG. 7 shows one embodiment of the slave station 3 shown in FIG. 1. This arrangement of the slave station is the same as that of the FIG. 5 master station except for a sending information storing device 24, a sending controlling device 25 and a pattern G sending device 26.

In FIG. 7, a communication control apparatus 23 causes, via a signal line 71, the sending controlling device 24 to store sending information (exchanging frame). When a pattern G detecting device 19 detects the pattern G via a data line 69, it instructs, via a signal line 60, an erasing device 14 to erase the received pattern G in a receiving shift register 13 and simultaneously, communicates with the sending controlling device 25 via a signal line 72. The sending controlling device 25 instructs, via a signal line 73, the sending information storing device 24 to send the stored exchanging frame. When receiving a signal applied via a signal line 78 after completion of the sending of the exchanging frame, the sending controlling device 25 also instructs, via a signal line 75, the pattern G sending device 26 to send the pattern G. Thus, sending of the exchanging frame and pattern G after receipt of the pattern G is performed via signal lines 76 and 77.

The pattern S is a pattern which can be detected by only a specified station for monitoring the abnormal GA pattern, and it is treated by the slave station as a similar pattern to a flag or a frame data from one slave station to another.

The pattern S reaching the slave station is simply passed downstream via demodulator 12, receiving shift register 13 and modulator 11. Accordingly, the slave station is unconscious of the passage of the pattern S.

In place of the specific pattern S detected by only the master station as described previously, a frame destined for the master station may be used. The master station then sends the destined frame and the specific pattern G to the loop in this order and sets destined frame and pattern G monitoring timers. The destined frame will not be delayed in each slave station and hence, it will circulate through one loop and return to the master station following the lapse of a fixed time. When detecting the destined frame, the master station will treat this frame in the same manner as the specific pattern S in the previous embodiment.

As described above, since, according to this invention, the master station adapted to send the specific patterns sends the specific pattern S or specific frame (S'), which is not delayed in each slave station, prior to sending the specific pattern G utilized for exchanging in each slave station, not only an abnormal doubled specific pattern G but also an abnormal disappearance of the specific pattern G can advantageously be detected.

Figure 8:
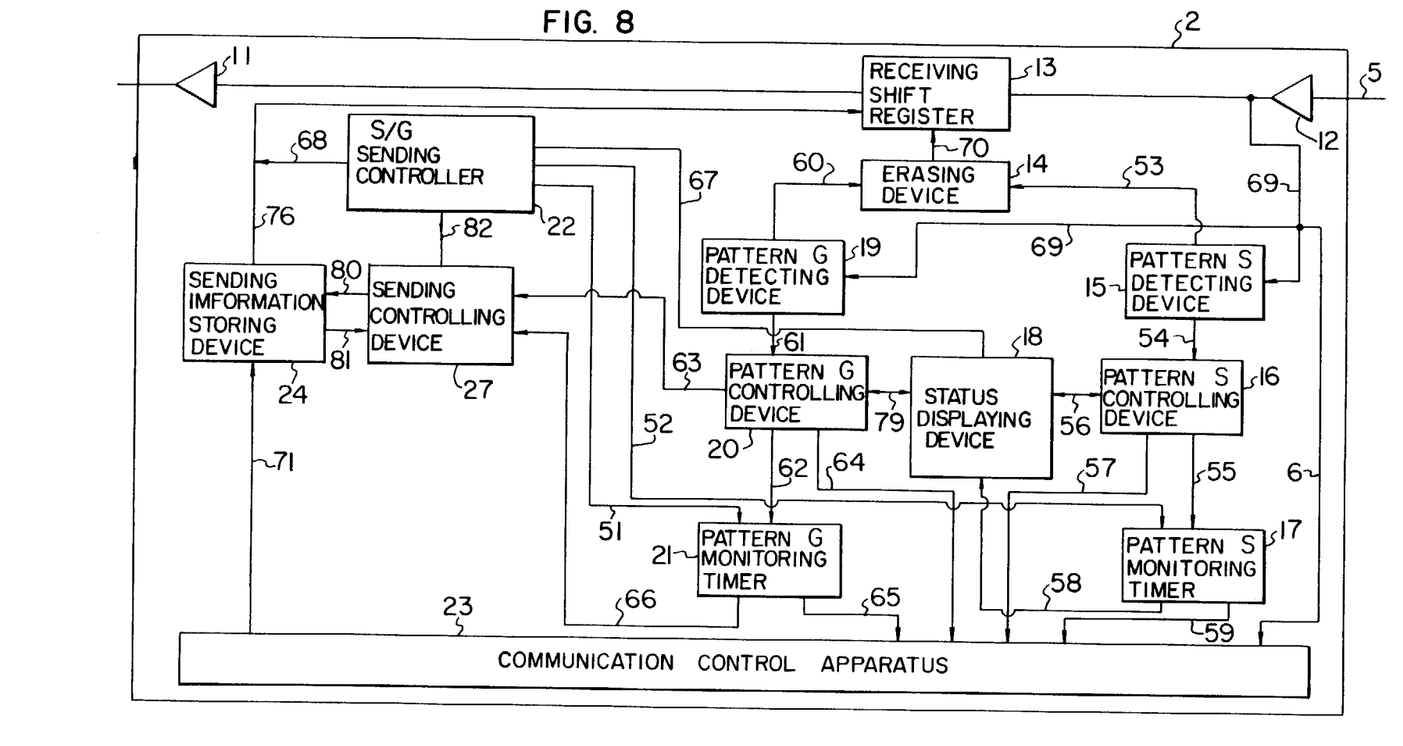
FIG. 8 is a block diagram showing another embodiment of the slave station incorporating the invention.

In the previous embodiment, the master station is a station for monitoring the patterns S and G. FIG. 8 illustrates another embodiment of the slave station wherein the function to monitor the patterns S and G sent by the master station is incorporated into the slave station.

Figure 9:
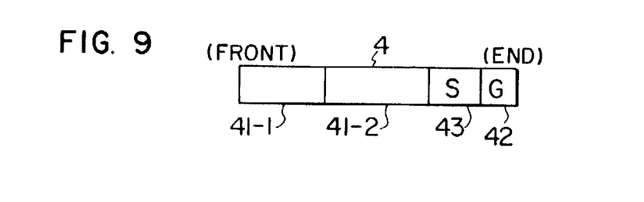
FIG. 9 is a diagrammatic representation of a transmission information format used in the FIG. 8 embodiment.

In FIG. 8, if a device 18 for displaying the monitored state of a pattern S is issuing "0" indicative of a non-monitoring operation when the pattern G is detected by a pattern G detecting device 19, a sending controlling device 27 is informed of this condition via a signal line 63. The sending controlling device 27 instructs, via a signal line 80, a sending information storing device 24 to send the exchanging frame stored therein. After completion of the sending of the exchanging frame, the sending information storing device supplies a signal to the sending controlling device 27 via a signal line 81. The sending controlling device 27 then instructs, via a signal line 82, a device 22 for controlling the sending of patterns S/G to send the patterns S and G. When the time of a pattern G monitoring timer 21 is up, the timer 21 communicates with the sending controlling device 27 via a signal line 66, and the same operation as described previously is performed. Thus, in the FIG. 8 embodiment, the instruction for sending the patterns S and G is issued from the sending controlling device 27. In other words, after the sending of the exchanging frame stored in the sending information storing device 24, the patterns S and G are sent. FIG. 9 shows one example of a loop information format sent from the specific slave station for monitoring the patterns S and G. As shown, exchanging frames 41-1 and 41-2 are followed by the pattern S in this format. If the pattern S precedes the exchanging frame, a problem as below arises. When the amount of exchanging frame data from the specific slave station is large, it happens that even when no pattern G is sent, the bit error of information in the exchanging frame, for example, results in a pattern G which returns to the specific slave station. Accordingly, a device is needed (or process) for checking this trouble, resulting in complicated hardware. On the other hand, the sending of the patterns S and G following the exchanging frame can be accomplished with a relatively simplified hardware. It is therefore preferable that when sending the loop information, the pattern S follows the exchanging frame and precedes the pattern G.

Figure 10:
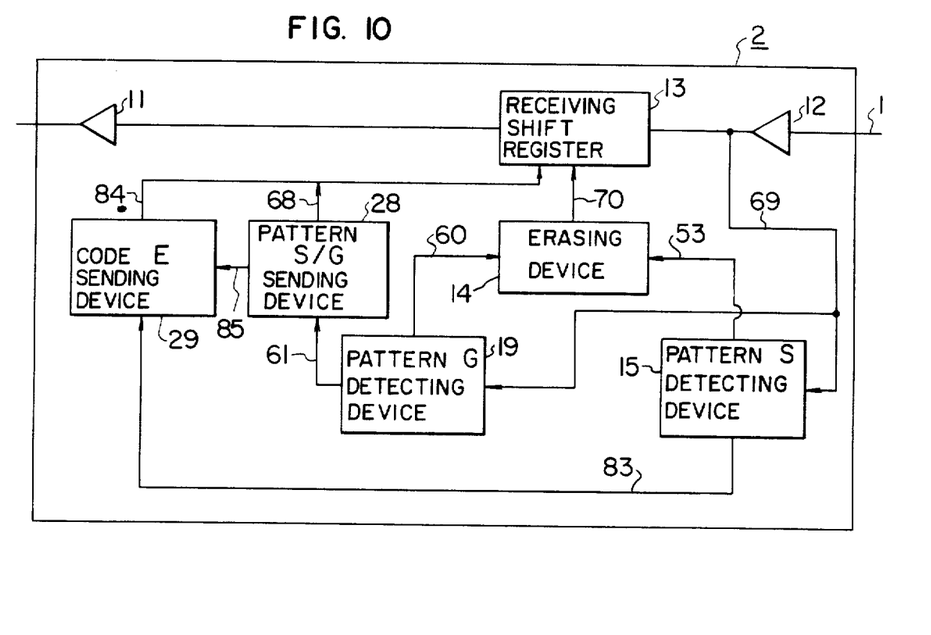
FIG. 10 is a block diagram showing another embodiment of the master station incorporating the invention.

FIG. 10 illustrates another embodiment of the master station incorporating the invention. This embodiment is different from the FIG. 5 embodiment in that it comprises a pattern S/G sending device 28 and a time fill-up code sending device 29. The pattern S/G sending device 28 causes the time fill-up code sending device 29 to send the time fill-up code E after completion of sending of the specific patterns S and G.

When a pattern S detecting device 15 detects, via a demodulator 12 and a signal line 69, the specific pattern S which returns to the master station after completion of circulation through a loop 1, it instructs, via a signal line 53, an erasing device 14 to erase the received pattern S in a receiving shift register 13 and concurrently therewith, causes, via a signal line 83, the time fill-up code sending device 29 to stop the sending of the time fill-up code E. Before the stoppage, the time fill-up code sending device 29 continues to send the time fill-up code E via a signal line 84.

When a pattern G detecting device 19 detects the pattern G, it instructs, via a signal line 60, the erasing device 14 to erase the received pattern G in the receiving shift register 13 and at the same time, causes, via a signal line 61, the pattern S/G sending device 28 to send the specific patterns S and G. The device 28 then causes, via a signal line 85, the time fill-up code sending device 29 to send the time fill-up code E.

The specific pattern S, which can be detected by only the master station and which is not delayed in each slave station as mentioned previously, leads the exchanging frame in circulating through one loop and returning to the master station. Accordingly, the data absent area other than the data present area on the loop can be filled with the time fill-up code E.

The specific pattern S is not always a pattern which can be detected by only the master station but it may be a pattern which is sent in advance of the exchanging frame.

Modulator 11 and demodulator 12 shown in FIG. 10 are adapted to modulate and demodulate data on the loop.

Figure 11:
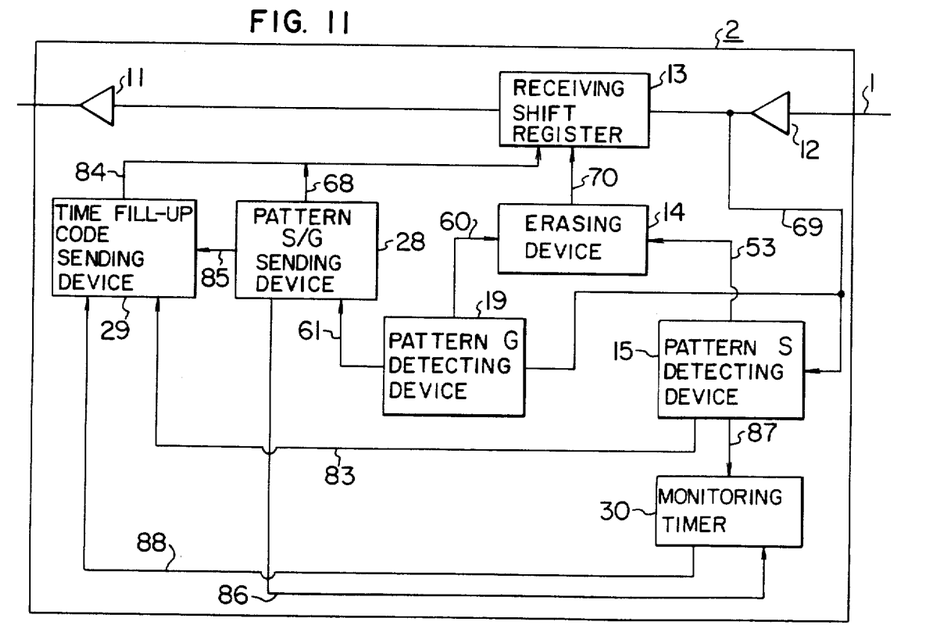
FIG. 11 is a block diagram showing still another embodiment of the master station incorporating the invention.

FIG. 11 illustrates still another embodiment of the master station incorporating a loop transmission system feature of the invention. This embodiment takes a defect of the specific pattern S into account and additionally comprises a monitoring timer 30 for monitoring circulation of the pattern S through the loop.

As in the FIG. 10 embodiment, a pattern S/G sending device 28 sends the patterns S and G, a time fill-up code sending device 29 sends the time fill-up code E, a pattern S detecting device 15 detects the pattern S, a pattern G detecting device 19 detects the pattern G, and an erasing device 14 erases the received patterns S and G in a receiving shift register 13. But, differing from the FIG. 10 embodiment, when the pattern S/G sending device 28 sends the pattern S, it also starts the monitoring timer 30 via a signal line 86. And, when the pattern S detecting device 15 detects the pattern S, it resets the timer 30 via a signal line 87. This timer is set to a value which equals a time for the pattern S to circulate through one loop and which is not affected by the amount of frame data from each station.

If the pattern S disappears owing to, for example, bit error, time-up of the monitoring timer 30 results and concurrently therewith, the timer 30 stops, via a signal line 88, the sending of the time fill-up code E from the time fill-up code sending device 29.

In the above embodiment adapted for sending the time fill-up code E, the slave station 3 may have the same construction as that of FIG. 7.

The slave station 3 delays the time fill-up code E by the frame sent from its own station and thereafter sends the pattern G. Consequently, sending of the time fill-up code E follows sending of the pattern G.

Details of component circuits in FIGS. 5, 7, 8, 10 and 11 will now be described.

Figure 12:
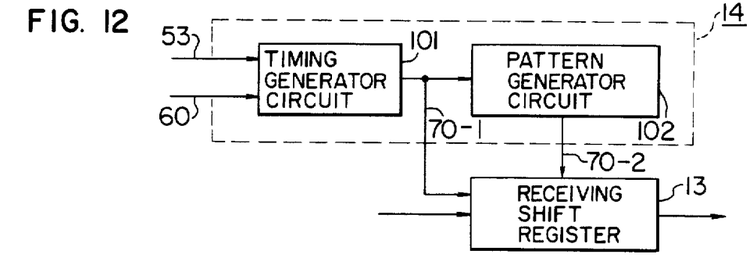
FIGS. 12 to 18 show details of exemplified components in the embodiments of FIGS. 5, 7, 8, 10 and 11.

The erasing device 14 is exemplified as shown in FIG. 12. A timing generator circuit 101 responseive to detection signals from the pattern S detecting device 15 and pattern G detecting device 19 generates a timing signal on a signal line 70-1. The timing signal operates a pattern generator circuit 102 for generation of an erasing pattern on a signal line. The erasing pattern is applied to the receiving shift register 13 in response to the timing signal on the signal line 70-1.

The pattern S/G sending device 28 in FIGS. 10 and 11, and the pattern G sending device 26 in FIG. 7 may have much the same construction as that of FIG. 12. Specifically, a timing generator circuit 101 used for the device 28 or 26 is responsive to the detection signal from the pattern G detecting device 19 or the sending controlling device 25 to generate a timing signal, and a pattern generator circuit 102 generates the specific patterns S and G or the pattern G. And, an additional construction is provided wherein the pattern S/G sending device 28 is responsive to the detection signal on the signal line 61 to send signals on the signal lines 85 and 86.

Figure 13:
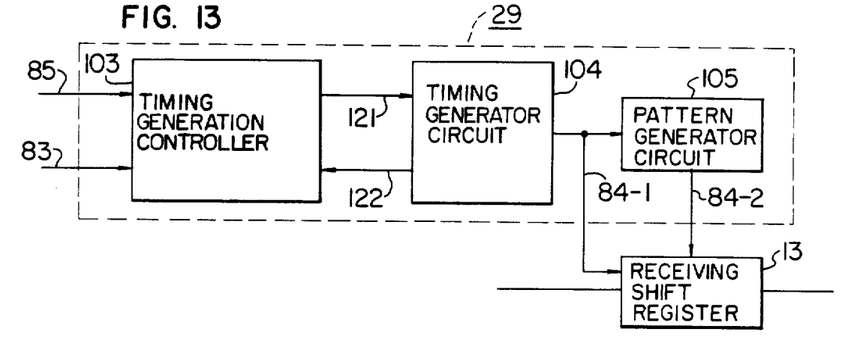

The time fill-up code sending device 29 in FIG. 10 is exemplified as shown in FIG. 13. A circuit 103 for controlling generation of repetitive timing of signal E sending is responsive to a signal on the signal line 85 from the pattern S/G sending device 28 to generate a predetermined signal on a signal line 121, which signal causes a timing generator circuit 104 for signal E sending to start generating a predetermined timing signal on a signal line 84-1 and at the same time, causes the timing generator circuit 104 to return a signal to the controlling circuit 103 via a signal line 122. Then, the controlling circuit 103 again sends a signal which operates the timing generator circuit 104. The controlling circuit 103 is then disabled by the detection signal sent from the pattern S detecting device 15 via the signal line 83. The timing signal generated from the timing generator circuit 104 causes a pattern generator circuit 105 to start generating, on a signal line 84-2, the specific pattern E which in turn is supplied to the receiving shift register 13.

The time fill-up code sending device 29 in FIG. 11 supplies to the controlling circuit 103 the signal on signal line 83 from the pattern S detecting device 15 and the signal on line 88 from the monitoring timer 30.

Figure 14:
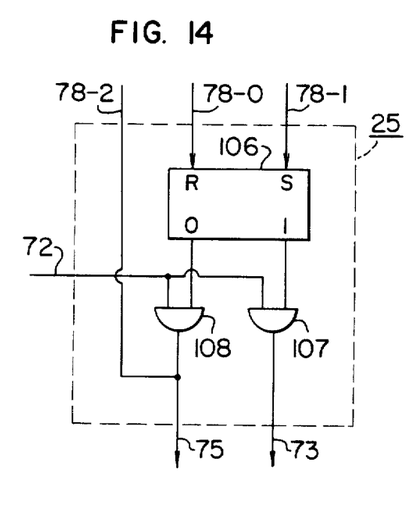

The sending controlling device 25 of FIG. 7 exemplified in FIG. 14 comprises a flip-flop circuit 106 and AND gates 107 and 108. A signal representative of the presence of data and a signal representative of the absence of data sent from the sending information storing device 24 via signal lines 78-1 and 78-0, respectively, are applied to set and reset terminals of the flip-flop circuit 106 so that set and reset outputs of the flip-flop circuit 106 are applied to the AND gates 107 and 108, respectively. The AND gates 107 and 108 are also supplied with the detection signal sent from the pattern G detecting device 19 via signal line 72. The output of the AND gate 107 is supplied via signal line 73 to the sending information storing device 24 to instruct the same to send the data whereas the output of the AND gate 108 is supplied via signal line 75 to the pattern G sending device 26 to instruct the same to send the pattern G. Also, a signal representative of the completion of data sending sent from the sending information storing device 24 via a signal line 78-2 is directly coupled to the signal line 75 to provide an instruction for sending the pattern G.

Figure 15:
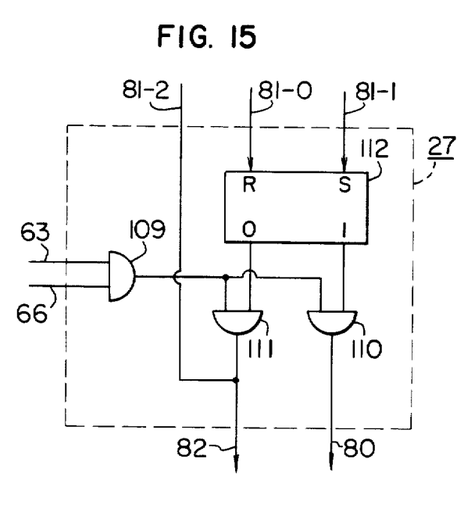

The sending controlling device 27 of FIG. 8 as exemplified in FIG. 15 is different from the FIG. 14 arrangement in that a signal sent from the pattern G controlling device 20 via signal line 63 and a signal sent from the pattern G monitoring timer 21 via signal line 66 are ORed at an OR gate 109 and the output of the OR gate 109 is supplied to AND gates 110 and 111.

Figure 16:
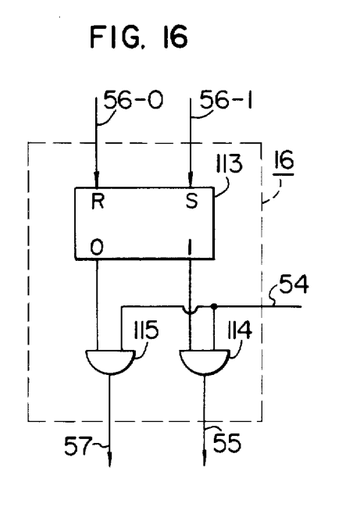

The pattern S controlling device 16 of FIGS. 5 and 8 is exemplified as shown in FIG. 16. Signals respectively representing the monitoring operation and the non-monitoring operation sent from the device 18 for displaying the monitored state of pattern S via signal lines 56-1 and 56-0, respectively, are applied to set and reset terminals of a flip-flop circuit 113 so that set and reset outputs of the flip-flop circuit 113 are applied to AND gates 114 and 115, respectively. The AND gates 114 and 115 are also supplied with the detection signal sent from the pattern S detecting device 15 via signal line 54. The outputs of the AND gates 114 and 115 are coupled to the pattern S monitoring timer 17 and the communication control apparatus 23 via signal lines 55 and 57, respectively.

Figure 17:
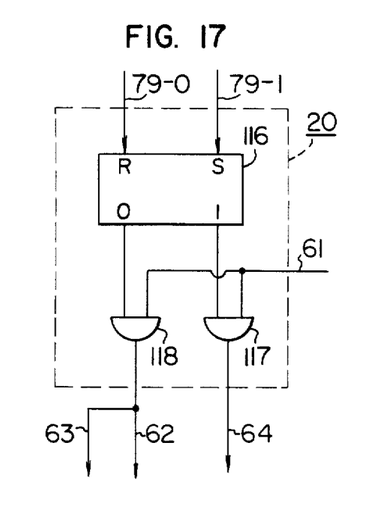

The pattern G controlling device 20 of FIGS. 5 and 8 exemplified in FIG. 17 is essentially the same as the arrangement of FIG. 16 but is different therefrom in that the output of an AND gate 118 is also coupled to the sending controlling device via signal line 63.

Figure 18:
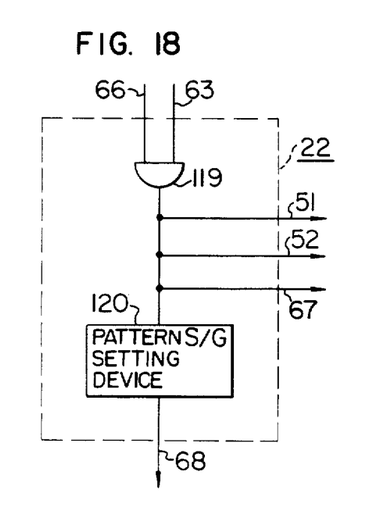

Exemplified in FIG. 18 is the device 22 for controlling the sending of patterns S/G. Signals from the pattern G controlling device 20 and the pattern G monitoring timer 21 respectively applied via signal lines 63 and 66 are ORed at an OR gate 119 and the output of the OR gate 119 is applied to a pattern S/G sending device 120 to cause the same to send the patterns S and G. This pattern S/G sending device 120 is constructed as described above.

The output of the OR gate 119 is coupled to the pattern S monitoring timer 17, pattern G monitoring timer 21 and device 18 for displaying the monitored state of pattern S via signal lines 51, 52 and 67, respectively.

Figure 19:
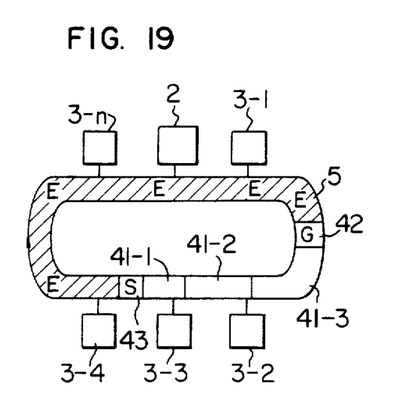
FIG. 19 is a diagram showing data state on the loop in the embodiments of the invention.

FIG. 19 illustrates the data state on the loop in the foregoing embodiments of the invention, showing that the data absent area between the specific pattern G and the specific pattern S is filled with the predetermined specific pattern, that is to say, the time fill-up code E.

Figure 20A:
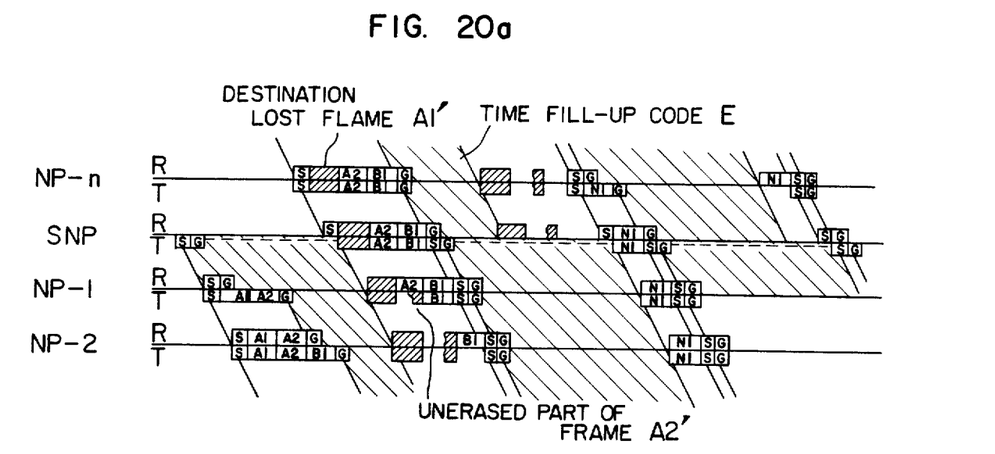
FIGS. 20a and 20b are diagrams useful in explaining effects attained by the embodiments of the invention.
Figure 20B:
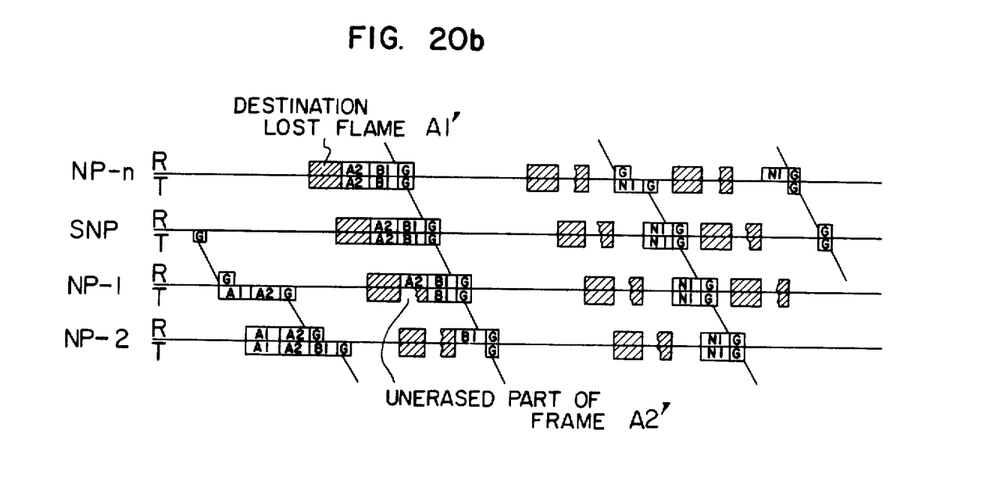

For better understanding of the effects attained by the loop transmission system of the invention as embodied in FIGS. 10 and 11, reference is now made to FIGS. 20a and 20b which illustrate the data flow on the loop in each station. In these figures, SNP denotes data flow in the master station 2, and NP-1, NP-2 and NP-n denote data flow in the slave stations 3-1, 3-2 and 3-n, respectively.

It is assumed in these figures that the slave station 3-1 sends exchanging frames A1 and A2 and the slave station 3-2 sends and exchanging frame B1.

As shown, if the bit error of the originator address in the exchanging frame A1 takes place in the process of data transmission from slave station 3-2 to slave station 3-n, this frame A1 turns into a destination lost frame A1'. Although the slave station 3-1 tries to erase the exchanging frames A1 and A2 sent by its own station, the frame A1 which has already turned into the destination lost frame A1' cannot be erased. Also, in the illustration of those figures, the slave station 3-1 generates an unerased part of frame A2' when erasing the exchanging frame A2 of its own.

In the prior art loop transmission system by the GA, as shown in FIG. 20b, erasing of these destinaion loss frame A1' and unerased part of frame A2' is entirely impossible and these faulty data frames circulate the loop semi-permanently and fill the data absent area.

On the contrary, in accordance with the loop transmission system of this invention, as shown in FIG. 20a, the data absent area between completion of the sending of the specific patterns S and G and the returning of the pattern S to the master station 2 is filled with the time fill-up code E as hatched so that the number of loop circulations of the unerased part of frame A2' is less than one (average: 0.5) and the number of loop circulations of the destination lost frame A1' is less than two (average: 1), thereby eliminating an adverse effect on the data transmission.

Further, when tracing the data flow on the loop, the boundary between the data area and the data absent area is advantageously made clear.

Furthermore, since, in the present invention, the time fill-up code is sent by only the master station, the reliability of the data transmission can be high and the hardware for start and stop of the time fill-up code sending can be reduced.

As has been described, the present invention ensures that faulty data such as the unerased part of a frame and the destination lost frame can be eliminated without causing a decrease of data transmission reliability and an increase of hardware.

We claim:

1. A method of loop transmission for a loop transmission system wherein a plurality of stations are coupled to a communication loop, comprising the steps of allotting to each station successively a right to transmission by detection in each station of a first specific signal pattern sent on said communication loop from a specified station when data exchanging is to be effected between the stations through the loop, sending from a station to the loop said first specific signal pattern when the sending of an exchanging data frame from that station on the loop is completed in that station, sending a second specific signal pattern to the loop from said specified station before sending said first specific signal pattern to the loop from the specified station, and sending said second specific signal pattern to the loop from a station before the exchanging data frame is sent from that station other than said specified station.

2. A loop transmission method according to claim 1, further including detecting said second specific signal pattern by only said specified station.

3. A loop transmission method according to claim 1, further including delaying said second specific signal pattern by only said specified station.

4. A loop transmission method according to claim 1, further including monitoring said first and second specific signal patterns, and recognizing said first specific pattern as doubled when said second specific signal pattern is not yet detected within a predetermined time for monitoring said second specific signal pattern at the time said first specific signal pattern is detected.

5. A loop transmission method according to claim 4, further including recognizing said second specific signal pattern as doubled when said second specific signal pattern is detected within the predetermined monitoring time or following a lapse of the predetermined time.

6. A loop transmission method according to claim 4 or 5, further including recognizing said first and second specific signal patterns as disappearing when said first and second specific signal patterns are not detected within predetermined times for monitoring said first and second specific signal patterns, respectively.

7. A loop transmission method according to any of claims 1 to 5, further including sending a third specified signal pattern not effecting the normal data transmission to the loop from said specified station during the interval between completion of sending of said first specific signal pattern and the returning of said second specific signal pattern to said specified station following circulation thereof once through the loop.

8. A loop transmission method according to claim 7, further including stopping the sending of said third specified signal pattern when said second specific signal pattern is not detected within the predetermined monitoring time following completion of sending of said second specific signal pattern.

9. A data transmission system comprising:
a communication loop;
a first station coupled to the loop including means for sending to the loop a second specific signal pattern in advance of sending of a first specific signal pattern; and
at least one second station connected to said loop and including means responsive to detection of said first specific pattern from said first station for sending to the loop and exchanging data frame following sending of said second specific pattern on said loop and thereafter sending said first specific pattern on said loop following said exchanging data frame.

10. A data transmission system according to claim 9 wherein said first station comprises monitoring means for monitoring signals received on said loop to detect said first and second specific signal patterns, and means for detecting doubling of at least one of said first and second specific signal patterns on the basis of results of the monitoring by said monitoring means.

11. A data transmission system according to claim 10, wherein said monitoring means comprises detecting means for examining whether or not said first and second specific signal patterns are detected within predetermined times for monitoring said first and second specific signal patterns, respectively, and means for recognizing said first specific signal pattern as doubled when said second specific signal pattern is not detected within the predetermined time for monitoring said second specific signal pattern at the time said first specific signal pattern is detected.

12. A data transmission system according to any of claims 9 to 11 wherein said first station comprises means for continuously sending a third pattern not affecting the data exchanging during the interval between completion of sending of said first specific signal pattern and the returning of said second specific signal pattern to said first station.

* * * * *